United States Patent
Anderson et al.

(12)

(10) Patent No.: US 6,233,974 B1
(45) Date of Patent: May 22, 2001

(54) OXYGEN-GASEOUS FOREHEARTH BURNER FOR AIR-FUEL AND OXY-FUEL FOREHEARTH BURNER BLOCK GEOMETRIES

(75) Inventors: Scott Anderson, Orlando; Jack L. Nitzman, Altamonte; Patrick J. Mohr, Mims, all of FL (US)

(73) Assignee: Combustion Tec, Apopka, FL (US)

( * ) Notice: Subject to any disclaimer, the term of this patent is extended or adjusted under 35 U.S.C. 154(b) by 0 days.

(21) Appl. No.: 09/237,159

(22) Filed: Jan. 25, 1999

(51) Int. Cl.[7] .................................................. C03B 5/235
(52) U.S. Cl. .............................. 65/134.4; 65/157; 65/346
(58) Field of Search .................................. 65/134.4, 157, 65/346

(56) References Cited

U.S. PATENT DOCUMENTS

| | | |
|---|---|---|
| 4,394,120 * | 7/1983 | Golovanov et al. ............... 431/284 |
| 4,515,553 * | 5/1985 | Morimoto et al. ..................... 431/8 |
| 4,531,960 | 7/1985 | Desprez ............................... 65/134 |
| 4,662,927 | 5/1987 | Blumenfeld ........................ 65/162 |
| 4,668,180 * | 5/1987 | Newman ............................ 431/187 |
| 4,690,635 * | 9/1987 | Coppin ............................... 431/187 |
| 4,708,728 | 11/1987 | Desprez et al. ..................... 65/136 |
| 5,092,760 | 3/1992 | Brown et al. ....................... 431/10 |
| 5,147,438 | 9/1992 | Castelain et al. .................. 65/135 |
| 5,169,424 | 12/1992 | Grinnen et al. .................... 65/346 |
| 5,199,866 * | 4/1993 | Joshi et al. ......................... 431/353 |
| 5,405,082 * | 4/1995 | Brown et al. ......................... 239/8 |
| 5,500,030 | 3/1996 | Joshi et al. ........................ 65/346 |
| 6,029,910 * | 2/2000 | Joshi et al. ........................ 239/404 |

* cited by examiner

Primary Examiner—Sean Vincent
(74) Attorney, Agent, or Firm—Pauley Petersen Kinne & Fejer

(57) ABSTRACT

An oxy-gaseous fuel burner for a forehearth system having an oxygen conduit, a fuel conduit disposed concentrically within the oxygen conduit and forming an annulus between the fuel conduit and the oxygen conduit, a precombustor conduit disposed at the oxygen outlet end of the oxygen conduit, and a fuel tip disposed at the fuel outlet end of the fuel conduit. The outlet of the fuel tip is disposed at or upstream of the inlet to the precombustor conduit.

8 Claims, 2 Drawing Sheets

OXYGEN-GASEOUS FOREHEARTH BURNER FOR AIR-FUEL AND OXY-FUEL FOREHEARTH BURNER BLOCK GEOMETRIES

BACKGROUND OF THE INVENTION

1. Field of the Invention

This invention relates to forehearth systems for conditioning molten glass from a glass melter and rendering it suitable for subsequent processing, such as forming it into a desired shape. More particularly, this invention relates to burner systems suitable for use in forehearth systems, and in particular, forehearth systems employing air-fuel and oxy-fuel forehearth burner block geometries.

2. Description of Prior Art

Glass melting furnaces require extremely high process temperatures for glass production. As a result, furnace flame temperatures and, thus, $NO_x$ generation, are high. As a result of the 1990 Clean Air Act, many regional municipalities now impose $NO_x$ emission limits on glass furnaces.

Throughout all segments of the glass industry, glass manufacturers have been adopting oxygen-fuel technologies to meet the increasingly stringent $NO_x$ emission limits. Substituting oxygen for air in the combustion process reduces $NO_x$ emissions and yields a more fuel efficient process, resulting in reduced $CO_2$ output. In addition to improved furnace emissions and fuel efficiency, oxy-fuel furnaces provide for more stable furnace operation and higher quality glass. At the present time, glass manufacturers are investigating the feasibility of converting air-fuel fired forehearths to oxy-fuel fired forehearths.

The forehearth section of a glass manufacturing operation is disposed between the glass melting furnace in which the raw materials for making glass are melted and the processing section in which the molten glass is processed into a desired form or shape. The forehearth system is designed to receive molten glass from the glass melting furnace and convey it to the glass processing operation, conditioning the molten glass during conveyance between the glass melter and the glass processing operation, thereby rendering it suitable for processing. In particular, the forehearth is designed to heat or cool the glass to the temperature required for processing. For some glass products, the temperature of the molten glass must be maintained within 1° or 2° F. at the inlet to the glass forming process. Conventional forehearths obtain temperature control through a series of small air-gas premix burners placed longitudinally on either side of the forehearth duct. Spacing between forehearth burners is typically between six and eighteen inches. A single forehearth can contain several hundred forehearth burners and a single glass furnace may have one or multiple forehearths.

Typical forehearth systems comprise a cooling section which receives molten glass from the melter portion of the furnace, and a front conditioning section which receives molten glass from the cooling section. The conditioning section lies between the cooling section and the glass processing section. The cooling and the conditioning sections are provided with independently controlled firing systems.

The cooling section of the forehearth system receives molten glass from the melter and cools or heats it to the proper average temperature required for the type of glass being made, such as containers made by a forming machine or fibers stretched by various attenuation devices. When the desired glass temperature cannot be obtained by radiation alone while maintaining properly set flames above the molten glass, additional cooling air is introduced into the cooling section of the forehearth above the molten glass.

From the cooling section, the glass flows into the conditioning section of the forehearth in which the temperature of the glass is equalized only by heating, using burners disposed within the walls of the forehearth, and not by cooling. The temperature in the conditioning section is controlled independently of the temperature in the cooling section. The conditioning section is intended only to hold and equalize the temperature and, thus, the viscosity of the glass.

Traditional firing systems for heating the glass in the conditioning section of a forehearth system are of a combustion premix design in which the fuel, for example natural gas, and combustion air are premixed together before they are introduced into the burner. See, for example, U.S. Pat. No. 5,169,424 which generally teaches a forehearth structure for a glass melting furnace including gas burners for providing heat to the molten glass flowing through the forehearth. See also U.S. Pat. No. 4,662,927 which teaches a forehearth system having fuel-air burner nozzles which provide a flame for heating the space above the flowing molten glass and U.S. Pat. No. 4,708,728 which teaches a premixed fuel-air burner for heating the forehearth of a glass melter, the burner having a capillary tube disposed coaxially therein and extending beyond the end of the burner for feeding oxygen into the fuel-air premixture.

Numerous problems exist for traditional forehearth firing systems which employ premixed air-fuel burners for heating the flowing gas, including poor fuel efficiency, little or no flame luminosity, very limited turn down ratio, a high volume of combustion gases and associated emissions within and outside of the glass plant, a generally high noise level due to the air-gas combustion system and, finally, the inability to provide precise temperature control of the glass, as small as 1° or 2° F. due to the significant variations in atmospheric air used by air-gas firing systems.

These problems can be addressed by the use of oxygen-utilizing combustion systems. The use of oxy-fuel fired forehearths results in reduced emissions and fuel consumption as well as better temperature control for improved glass quality. For example, a 100% oxy-fuel combustion system can reduce fuel consumption by about 60% compared to air-fuel combustion without any heat recovery. U.S. Pat. No. 5,147,438 teaches an auxiliary oxy-fuel burner for glass melting having a central fuel nozzle disclosed concentrically within an oxygen nozzle; U.S. Pat. No. 4,531,960 teaches a process for making glass using air-fuel and oxygen-fuel burners where the flame produced by the oxygen-fuel burners is surrounded by a current of auxiliary gas, such as air or nitrogen, introduced through an annular space surrounding the burner; and U.S. Pat. No. 5,092,760 teaches an oxy-liquid fuel burner where oxygen or carbon dioxide are used as an atomizing fluid for the liquid fuel. U.S. Pat. No. 5,500,030 teaches an oxy-gas forehearth burner which produces a luminous pencil-like shaped flame. This type of flame, when fired through an existing air-gas forehearth burner block recirculates particulates and combustion gases up through the forehearth burner block. This recirculation accelerates burner tip corrosion and plugging, which leads to premature failure of the burner. In addition, because the gas and oxygen flow streams are parallel to each other upon exit from the burner, mixing is delayed, resulting in a long flame which can impinge on the opposing wall of a narrow forehearth. For optimal performance and burner life, the burner taught by this patent should be fired through a specially designed burner block for oxy-gas firing. Thus, retrofitting of existing air-gas fired forehearths with oxy-gas forehearth burners of the type taught by the '030 patent also requires replacement of the burner block. Thus, due to the multitude of existing air-gas forehearth burners in a forehearth system, it is advantageous to utilize oxy-gas forehearth burners which are retrofittable to existing air-gas forehearth burner block geometries, thereby obviating the need for replacement of existing air-gas forehearth burner blocks with specially designed burner blocks for oxy-gas firing.

SUMMARY OF THE INVENTION

Accordingly, it is one object of this invention to provide a forehearth burner system which can be retrofitted to existing burner block geometries currently employed in air-gaseous fuel forehearth systems or designed burner blocks for oxy-fuel firing.

It is another object of this invention to provide a forehearth burner system having a higher turndown ratio than conventional air-gaseous fuel forehearth burner systems.

It is yet another object of this invention to provide a forehearth burner system which is fuel efficient.

It is still another object of this invention to provide a forehearth system for a glass melting furnace having improved forehearth temperature control.

It is yet another object of this invention to provide an oxy-gaseous fuel forehearth burner having a turndown ratio of at least 3:1 which is capable of firing through air-gaseous fuel forehearth burner geometries.

It is another object of this invention to provide an oxy-gaseous fuel forehearth burner having a continuous use life cycle greater than about six months which is capable of firing through air-gaseous fuel forehearth burner block geometries.

These and other objects of this invention are achieved by an oxy-gaseous fuel burner for a forehearth system comprising an oxygen conduit having an oxygen inlet end and an oxygen outlet end, a fuel conduit having a fuel inlet end and a fuel outlet end disposed concentrically within the oxygen conduit and forming an annulus between the fuel conduit and the oxygen conduit, a precombustor conduit disposed at the oxygen outlet end of the oxygen conduit having a fuel/oxygen inlet and a fuel/oxygen outlet, and a fuel tip disposed at the fuel outlet end of the fuel conduit having a fuel tip fuel inlet and fuel tip fuel outlet, which fuel tip fuel outlet is disposed at or upstream of the fuel/oxygen inlet of the precombustor conduit.

In accordance with a particularly preferred embodiment of this invention, the precombustor conduit has a circular cross-sectional geometry and the ratio of the diameter of the precombustor conduit at the fuel/oxygen inlet to the length of the precombustor conduit is in the range of about 0.5 to about 8.0. In addition, the fuel/oxygen outlet of the precombustor conduit, in accordance with one embodiment of this invention, has a larger cross-sectional area than the fuel/oxygen inlet of the precombustor conduit.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
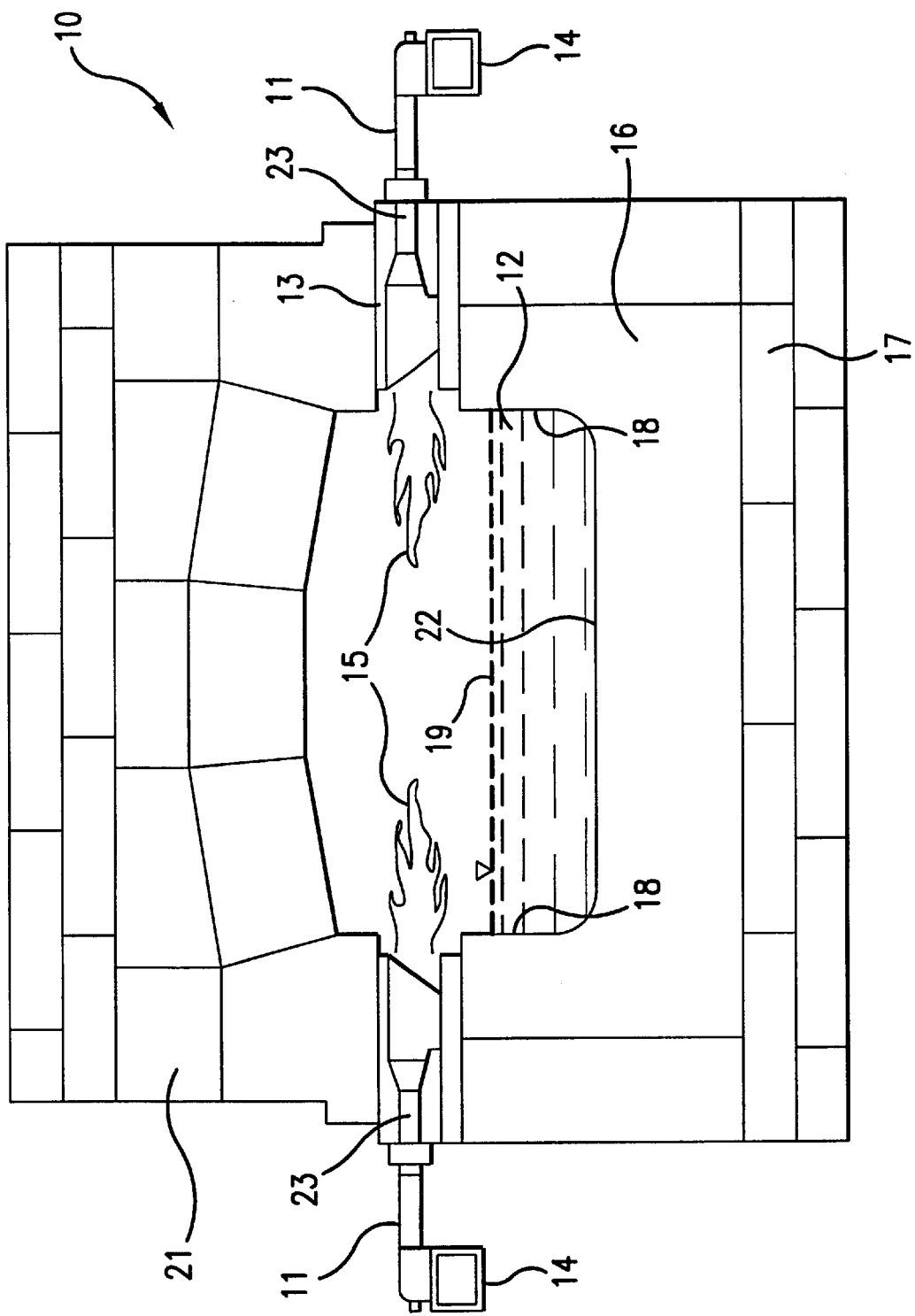
FIG. 1 is a cross-sectional view of a forehearth suitable for use with a glass melter.

FIG. 1 is a cross-sectional view of a typical forehearth 10 for a glass melting furnace comprising longitudinally extending trough 16 supporting a bed of molten glass 12 therein. Trough 16 is supported by substructure 17. Trough 16 has a substantially wide floor portion 22 and oppositely-disposed inner sidewall surfaces 18 which project above the top level or upper surface 19 of molten glass 12. Above trough 16, and spanning the trough width, is roof structure 21, typically formed in a building block arrangement using solid refractory and insulating block sections having complementary registering surfaces between adjacent sections which stack and unite to form the whole.

Along the flat top surface of each long side of trough 16 are burner blocks 13. Burner blocks 13 rest upon both trough 16 respective top wall surfaces and the respective top wall surfaces of substructure 17. Roof structure 21, along with burner blocks 13, define a longitudinally-extending space or tunnel above top surface 19 of molten glass 12. Each burner block 13 forms a laterally extending burner block bore which communicates with the longitudinally-extending space above top surface 19 of molten glass 12. Disposed within the bore is nozzle 23 of burner 11. Fuel and air are provided through manifold 14 and are ignited, producing flame 15 in the space disposed above top surface 19 of molten glass 12.

The fuel efficiency of an "air-gaseous fuel" system, particularly due to nitrogen contained in the air, compared to 100% oxygen-fuel combustion is significantly inferior. For example, a 100% oxygen-natural gas combustion reduces fuel consumption by about 60% compared to "air-natural gas" combustion without any heat recovery. In addition, the use of "oxygen-natural gas" combustion results in a reduction in the volume of combustion gases by about 80% coupled with a significant reduction in $NO_x$ emissions and volatiles from the glass. In addition, by eliminating combustion air blowers/compressors, the noise level around the melter is reduced by 20 to 35 dB, providing a significant improvement in the working environment.

Figure 2:
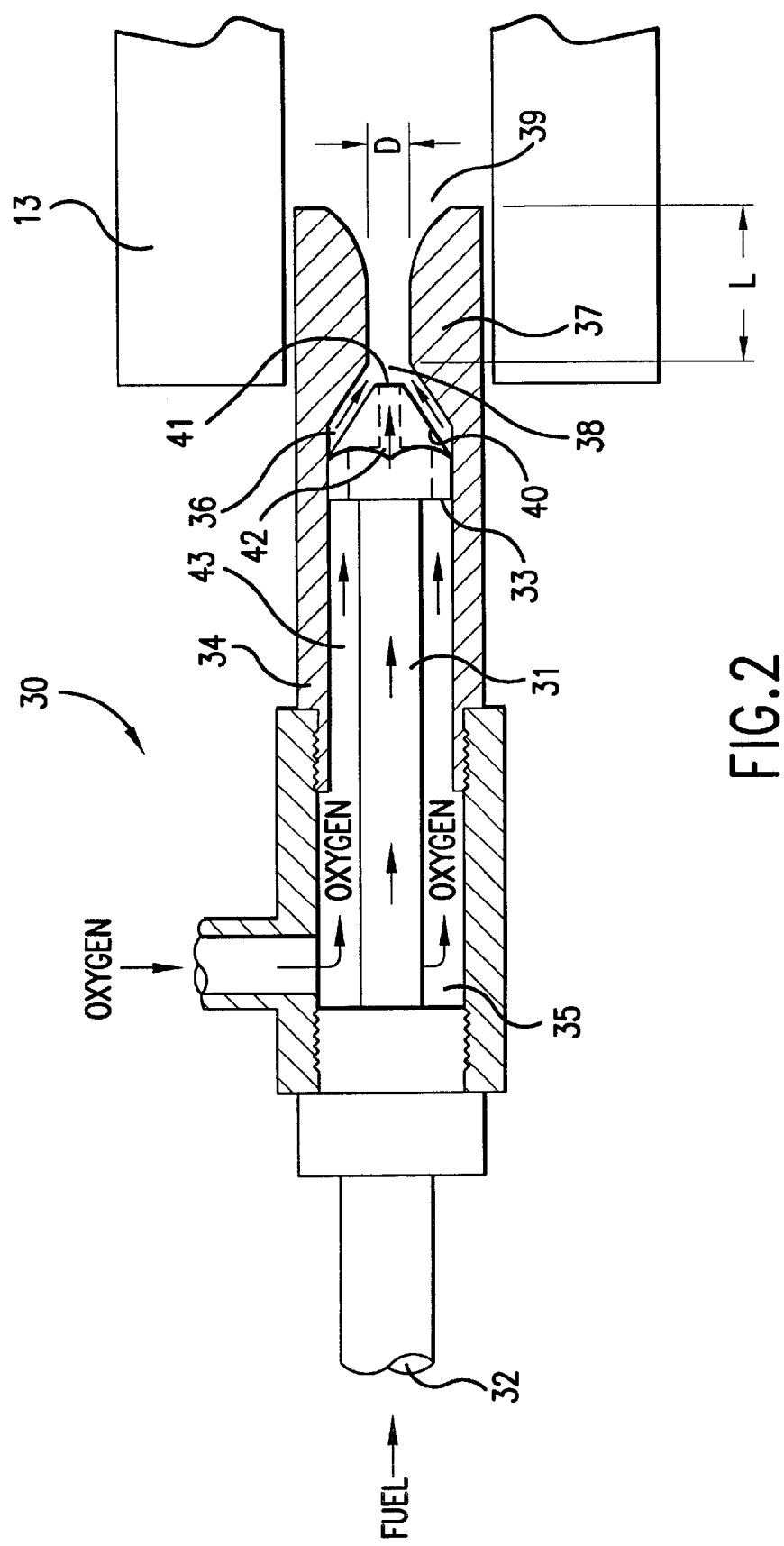
FIG. 2 is a partial cross-sectional side view of an oxy-gaseous fuel burner disposed within a forehearth burner block in accordance with one embodiment of this invention.

An oxy-gaseous fuel burner 30 suitable for use with gaseous fuels including natural gas, in accordance with one embodiment of this invention suitable for use in a forehearth system is shown in cross-section in FIG. 2. Oxy-gaseous fuel burner 30 comprises fuel conduit 31 having fuel conduit inlet end 32 and fuel conduit outlet end 33 concentrically disposed within oxygen conduit 34 having oxygen inlet end 35 and oxygen outlet end 36. Disposed at said oxygen outlet end 36 of oxygen conduit 34 is a precombustor conduit 37 having fuel/oxygen inlet 38 and fuel/oxygen outlet 39. Fuel tip 40 having fuel tip fuel inlet 42 and fuel tip fuel outlet 41 is disposed at fuel outlet end 33 of fuel conduit 31. Fuel tip fuel outlet 41 is disposed at or upstream of fuel/oxygen inlet 38 of precombustor conduit 37.

In accordance with one preferred embodiment of this invention, the outer surface of fuel tip 40 and the inner surface of oxygen conduit 34 proximate oxygen outlet end 36 are tapered, converging in a direction of precombustor conduit 37. In operation, fuel is introduced into fuel conduit 31 through fuel conduit inlet 32 and oxygen is introduced into annulus 43 formed between oxygen conduit 34 and fuel conduit 31 proximate oxygen inlet end 35 of oxygen conduit 34. As oxygen flows around fuel tip 40, the oxygen flow vector is altered such that the oxygen flow converges toward the fuel exiting fuel tip fuel outlet 41. The fuel and oxygen are then discharged into precombustor conduit 37. The fuel and oxygen flows intersect almost immediately upon being discharged into precombustor conduit 37, resulting in rapid mixing.

In accordance with one preferred embodiment of this invention, the length to diameter ratio (L/D) of precombustor conduit 37 is between about 0.5 and 8.0. The diameter (D) is measured at fuel/oxygen inlet 38 of precombustor conduit 37 and the length (L) is measured from fuel/oxygen inlet 38 to fuel/oxygen outlet 39 of precombustor conduit 37.

In accordance with a particularly preferred embodiment of this invention, the cross-sectional geometry of precombustor conduit 37 is circular. In accordance with one preferred embodiment of this invention, the cross-sectional area of precombustor conduit 37 is constant over the entire precombustor length (L). In accordance with another preferred embodiment of this invention, the cross-sectional area of precombustor conduit 37 is constant over an initial portion of precombustor length (L) beginning at fuel/oxygen inlet 38 and then increasing incrementally to fuel/oxygen outlet 39. In accordance with yet another preferred embodiment of this invention, the cross-sectional area of precombustor conduit 37 increases incrementally over the entire precombustor conduit length (L). In accordance with a particularly preferred embodiment of this invention, fuel/oxygen outlet 39 of precombustor conduit 37 has a larger cross-sectional area than fuel/oxygen inlet of precombustor conduit 37. The resulting oxy-fuel flame from burner 30 and precombustor conduit 37 is bushy and non-luminous. The increasing cross-sectional area of precombustor conduit 37 aids in the transition of combustion gases from the small diameter of fuel/oxygen inlet 38 of precombustor conduit 37 to the relatively large diameter of forehearth burner block 13. This gradual transition, along with the resulting bushy flame, eliminates recirculation of particulates and combustion gases back to fuel tip 40.

Accordingly, a forehearth system in accordance with this invention for conveyance and temperature control of molten glass comprises a floor portion and oppositely disposed sidewalls adjacent the floor portion forming an elongated trough, a roof portion adjacent the sidewalls and disposed over the trough, and firing means disposed within at least one opening in the sidewalls. The firing means comprises an oxy-fuel burner comprising an oxygen conduit having an oxygen inlet end and an oxygen outlet end, a fuel conduit having a fuel inlet end and a fuel outlet end disposed concentrically within the oxygen conduit and forming an annulus between the fuel conduit and the oxygen conduit, a precombustor conduit disposed at the oxygen outlet end of the oxygen conduit having a fuel/oxygen inlet and a fuel/oxygen outlet, and a fuel tip disposed at the fuel outlet end of the fuel conduit having a fuel tip fuel inlet and a fuel tip fuel outlet, wherein the fuel tip fuel outlet is disposed at or upstream of the fuel/oxygen inlet of the precombustor conduit.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An oxy-gaseous fuel burner for a forehearth system comprising:

an oxygen conduit having an oxygen inlet end and an oxygen outlet end;

a fuel conduit having a fuel inlet end and a fuel outlet end disposed concentrically within said oxygen conduit and forming an annulus between said fuel conduit and said oxygen conduit;

a precombustor conduit disposed at said oxygen outlet end of said oxygen conduit having a fuel/oxygen inlet and a fuel/oxygen outlet;

a fuel tip disposed at said fuel outlet end of said fuel conduit having a fuel tip fuel inlet and a fuel tip fuel outlet, said fuel tip fuel outlet disposed one of at and upstream of said fuel/oxygen inlet of said precombustor conduit; and an outer surface of said fuel tip and an inner surface of said oxygen conduit proximate said oxygen outlet end being tapered, converging in a direction of said precombustor conduit.

2. An oxy-gaseous fuel burner in accordance with claim 1, wherein said precombustor conduit has a circular cross-sectional geometry.

3. An oxy-gaseous fuel burner in accordance with claim 2, wherein a ratio of a diameter of said precombustor conduit at said fuel/oxygen inlet to a length of said precombustor conduit is in a range of about 0.5 to about 8.0.

4. An oxy-gaseous fuel burner in accordance with claim 1, wherein said fuel/oxygen outlet of said precombustor conduit has a larger cross-sectional area than said fuel/oxygen inlet of said precombustor conduit.

5. In a forehearth system for conveyance and temperature control of molten glass having a floor portion and oppositely disposed sidewalls adjacent said floor portion forming an elongated trough, a roof portion adjacent said sidewalls and disposed over said trough, and firing means disposed within at least one opening in said sidewalls, the improvement comprising:

said firing means comprising an oxy-gaseous fuel burner comprising an oxygen conduit having an oxygen inlet end and an oxygen outlet end, a fuel conduit having a fuel inlet end and a fuel outlet end disposed concentrically within said oxygen conduit and forming an annulus between said fuel conduit and said oxygen conduit, a precombustor conduit disposed at said oxygen outlet end of said oxygen conduit having a fuel/oxygen inlet and a fuel/oxygen outlet, and a fuel tip disposed at said fuel outlet end of said fuel conduit having a fuel tip fuel inlet and a fuel tip fuel outlet, said fuel tip fuel outlet disposed one of at and upstream of said fuel/oxygen inlet of said precombustor conduit and an outer surface of said fuel tip and an inner surface of said oxygen conduit proximate said oxygen outlet end being tapered, converging in a direction of said precombustor conduit.

6. A forehearth system in accordance with claim 5, wherein said precombustor conduit has a circular cross-sectional geometry.

7. A forehearth system in accordance with claim 6, wherein a ratio of a diameter of said precombustor conduit at said fuel/oxygen inlet to a length of said precombustor conduit is in a range of about 0.5 to about 8.0.

8. A forehearth system in accordance with claim 5, wherein said fuel/oxygen outlet of said precombustor conduit has a larger cross-sectional area than said fuel/oxygen inlet of said precombustor conduit.

* * * * *